US007933935B2

(12) United States Patent
Idicula et al.

(10) Patent No.: US 7,933,935 B2
(45) Date of Patent: Apr. 26, 2011

(54) EFFICIENT PARTITIONING TECHNIQUE WHILE MANAGING LARGE XML DOCUMENTS

(75) Inventors: Sam Idicula, San Jose, CA (US); Sivasankaran Chandrasekar, Palo Alto, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 186 days.

(21) Appl. No.: 11/716,074

(22) Filed: Mar. 8, 2007

(65) Prior Publication Data

US 2008/0091714 A1 Apr. 17, 2008

Related U.S. Application Data

(60) Provisional application No. 60/829,652, filed on Oct. 16, 2006.

(51) Int. Cl.
*G06F 17/00* (2006.01)

(52) U.S. Cl. ........ 707/811; 707/803; 707/812; 707/755; 707/E17.127

(58) Field of Classification Search .................. 707/100, 707/104.1, 811, 802, 812, 755, E17.127, 707/999.103; 715/234–239
See application file for complete search history.

(56) References Cited

U.S. PATENT DOCUMENTS 5,295,261 A 3/1994 Simonetti
5,404,513 A 4/1995 Powers et al.
5,467,471 A 11/1995 Bader
5,680,614 A 10/1997 Bakuya et al.
5,724,577 A 3/1998 Exley et al.
5,734,887 A 3/1998 Kingberg et al.
5,878,415 A 3/1999 Olds
5,974,407 A 10/1999 Sacks
5,987,506 A 11/1999 Carter et al.
6,003,040 A 12/1999 Mital et al.
6,018,747 A 1/2000 Burns et al.
6,038,563 A 3/2000 Bapat et al.
6,055,544 A 4/2000 DeRose et al.
6,061,684 A 5/2000 Glasser et al.
6,115,705 A 9/2000 Larson (Continued)

FOREIGN PATENT DOCUMENTS

EP 1 241589 A2 9/2002

(Continued)

OTHER PUBLICATIONS

Chakraborty, Krishnendu, "The XML Garbage Collector", The Source for Developers, Sun Developer Network Site XP-002297849, Mar. 2002.

(Continued)

*Primary Examiner* — Leslie Wong
*Assistant Examiner* — Shiow-Jy Fan
(74) *Attorney, Agent, or Firm* — Hickman Palermo Truong & Becker LLP

(57) ABSTRACT

A method is provided to efficiently evaluate an expression to determine the partition key for an XML document stored in a database without the entire XML document first being stored in temporary memory storage. The partition key is determined using streaming evaluation or incrementally using a DOM node tree as a portion of the document is read and stored in the buffer. The XML document is stored in the partition using the read portion of the document stored in the buffer and the remaining portion from the original source.

16 Claims, 2 Drawing Sheets

U.S. PATENT DOCUMENTS 6,128,610 A 10/2000 Srinivasan et al.
6,141,655 A 10/2000 Johnson et al.
6,154,741 A 11/2000 Feldman
6,189,012 B1 2/2001 Mital et al.
6,199,195 B1 3/2001 Goodwin et al.
6,208,993 B1 3/2001 Shadmone
6,236,988 B1 5/2001 Aldred
6,263,332 B1 7/2001 Nasr et al.
6,269,380 B1 7/2001 Terry et al.
6,279,006 B1 8/2001 Shigemi et al.
6,279,007 B1 8/2001 Uppala
6,298,349 B1 10/2001 Toyoshima et al.
6,343,287 B1 1/2002 Kumar et al.
6,356,920 B1 3/2002 Vandersluis
6,360,302 B1 3/2002 Baylor
6,366,934 B1 4/2002 Cheng et al.
6,370,537 B1 4/2002 Gilbert et al.
6,470,344 B1 10/2002 Kothuri et al.
6,487,546 B1 11/2002 Witkowski
6,496,842 B1 12/2002 Lyness
6,539,398 B1 3/2003 Hannan et al.
6,542,911 B2 4/2003 Chakraborty et al.
6,571,231 B2 5/2003 Sedlar
6,598,055 B1 7/2003 Keesey et al.
6,604,100 B1 8/2003 Fernandez et al.
6,609,121 B1 8/2003 Ambrosini et al.
6,636,845 B2 10/2003 Chau et al.
6,643,633 B2 11/2003 Chau et al.
6,654,761 B2 11/2003 Tenev et al.
6,662,342 B1 12/2003 Marcy
6,684,227 B2 1/2004 Duxbury
6,704,739 B2 3/2004 Craft et al.
6,704,747 B1 3/2004 Fong
6,708,186 B1 3/2004 Claborn et al.
6,718,322 B1 4/2004 Brye
6,721,723 B1 4/2004 Gibson et al.
6,725,212 B2 4/2004 Couch et al.
6,754,661 B1 6/2004 Hallin et al.
6,772,350 B1 8/2004 Belani et al.
6,785,673 B1 8/2004 Fernandez et al.
6,801,224 B1 10/2004 Lewallen
6,826,727 B1 11/2004 Mohr et al.
6,836,778 B2 12/2004 Manikutty et al.
6,836,857 B2 12/2004 Ten-Hove et al.
6,915,304 B2 7/2005 Krupa
6,915,307 B1 7/2005 Mattis et al.
6,920,457 B2 7/2005 Pressmar
6,957,237 B1 10/2005 Traversat et al.
6,964,025 B2 11/2005 Angiulo et al.
7,031,956 B1 4/2006 Lee et al.
7,043,488 B1 5/2006 Baer et al.
7,089,239 B1 8/2006 Baer et al.
7,113,942 B2 9/2006 Levanoni et al.
7,134,072 B1 11/2006 Lovett et al.
7,139,746 B2 11/2006 Shin et al.
7,162,485 B2 1/2007 Gottlob et al.
7,406,522 B2 7/2008 Riddle
7,451,128 B2 11/2008 Song et al.
7,457,910 B2 11/2008 Chang et al.
2001/0049818 A1 12/2001 Banerjia et al.
2002/0056025 A1 5/2002 Qiu et al.
2002/0073019 A1 6/2002 Deaton
2002/0078068 A1 6/2002 Krishnaprasad et al.
2002/0087596 A1 7/2002 Lewontin
2002/0116371 A1 8/2002 Dodds et al.
2002/0116457 A1 8/2002 Eshleman et al.
2002/0133484 A1 9/2002 Chau et al.
2002/0143512 A1 10/2002 Shamoto et al.
2002/0156811 A1 10/2002 Krupa
2002/0184188 A1 12/2002 Mandyam et al.
2002/0184401 A1 12/2002 Kadel, Jr. et al.
2003/0004937 A1 1/2003 Salmenkaita et al.
2003/0009361 A1 1/2003 Hancock et al.
2003/0065659 A1 4/2003 Agarwal et al.
2003/0069881 A1* 4/2003 Huttunen .......................... 707/5
2003/0078906 A1 4/2003 Ten-Hove et al.
2003/0093672 A1 5/2003 Cichowlas
2003/0101194 A1 5/2003 Rys et al.
2003/0115421 A1 6/2003 McHenry et al.
2003/0140308 A1* 7/2003 Murthy et al. ................ 715/500
2003/0172135 A1 9/2003 Bobick et al.
2003/0182624 A1 9/2003 Large
2003/0212662 A1 11/2003 Shin et al.
2003/0212664 A1 11/2003 Breining et al.
2003/0236903 A1* 12/2003 Piotrowski ................... 709/231
2004/0010752 A1 1/2004 Chan et al.
2004/0043758 A1 3/2004 Sorvari et al.
2004/0064466 A1 4/2004 Manikutty et al.
2004/0066529 A1 4/2004 Wu et al.
2004/0083209 A1 4/2004 Shin
2004/0088320 A1 5/2004 Perry
2004/0088415 A1 5/2004 Chandrasekar et al.
2004/0148278 A1 7/2004 Milo et al.
2004/0176958 A1 9/2004 Salmenkaita et al.
2004/0210573 A1 10/2004 Abe et al.
2004/0220912 A1 11/2004 Manikutty et al.
2004/0225680 A1 11/2004 Cameron et al.
2004/0230667 A1 11/2004 Wookey
2004/0267760 A1 12/2004 Brundage et al.
2004/0268244 A1* 12/2004 Levanoni et al. ............ 715/514
2005/0050016 A1 3/2005 Stanoi et al.
2005/0050058 A1 3/2005 Jain et al.
2005/0050092 A1 3/2005 Jain et al.
2005/0091188 A1 4/2005 Pal et al.
2005/0097084 A1 5/2005 Balmin et al.
2005/0102256 A1 5/2005 Bordawekar et al.
2005/0120031 A1 6/2005 Ishii
2005/0228792 A1 10/2005 Chandrasekaran et al.
2005/0228818 A1 10/2005 Murthy et al.
2005/0289125 A1 12/2005 Liu et al.
2006/0021246 A1 2/2006 Schulze et al.
2006/0047717 A1 3/2006 Pereira
2006/0129524 A1 6/2006 Levanoni et al.
2006/0129584 A1 6/2006 Hoang et al.
2006/0200439 A1 9/2006 Bhatia et al.
2007/0005624 A1 1/2007 Wu et al.
2007/0043751 A1 2/2007 Chen et al.
2007/0198467 A1 8/2007 Wiser et al.
2007/0271305 A1 11/2007 Chandrasekar et al.
2009/0150412 A1 6/2009 Idicula et al.

FOREIGN PATENT DOCUMENTS

WO WO 00/49533 A2 8/2000
WO WO 01/59602 A1 8/2001
WO WO 01/61566 A1 8/2001
WO WO 03107576 12/2003
WO WO 2006026534 3/2006

OTHER PUBLICATIONS

Chen, Ruey-Shun et al., “Developing an XML framework for metadata system”, Trinity College Dublin, Proc. of the 1st Inter. Sympo. on Information and Communication, pp. 267-272.

Cheng, Josephine et al., “IBM DB2 XML Extender,” IEEE, ICDE ’00 Conference, San Diego, Feb. 2000, 128 pages.

Lo et al., “XAS: A System for Accessing Componentized, Virtual XML Documents,” IEEE, 2001, pp. 493-502.

Manolescu, Dragos, Review of “Metadata solutions: using metamodels, repositories, XML, and enterprise portals to generate information on demand by Adrienne Tannenbaum”, Mar. 2003, ACM Press, vol. 28, Issue 2, p. 38.

Myllymaki, Jussi, “Effective Wed data Extraction with Standard XML Technologies,” WWW10, May 1-5, 2001, pp. 689-696.

Noser, Hansrudi, et al., “Dynamic 3D Visualization of Database-Defined Tree Structures on the WWW by Using Rewriting Systems,” 2000, IEEE, XP-002262516, pp. 247-254.

Peng, Feng et al., “XPath queries on streaming data” (2003) *ACM Press*, pp. 431-442.

Schmidt et al., “Why and How to Benchmark XML Databases,” SIGMOND Record, vol. 3, No. 3, Sep. 2001, pp. 27-32.

Vion-Dury, Jean-Yves, “XPath on left and right sides of rules: toward compact XML tree rewriting through node patterns” (2003) *ACM Press*, pp. 19-25.

Vorthmann, S. et al. "Beyond Schemas, Schema Adjuncts and the Outside World," Markup Languages, Online!, vol. 2, No. 3, Jun. 2000, pp. 1-8.

Yoshikawa, Masatoshi et al., "XRel: A Path-Based Approach to Storage and Retrieval of XML Documents Using Relational Databases", XP-001143686, *ACM Transactions on Internet Technology* (2001), pp. 110-141.

Zisman et al., "Using XML to Build Consistency Rules for Distributed Specifications," Proceedings of the Tenth International Workshop on Software Specification and Design (IWSD'00), IEEE 2000, 8 pages.

PCT/US2007/010163, Notification of Transmittal of the International Search Report and the Written Opinion of the International Searching Authority, Oct. 12, 2007, 12 pages.

Zhang, et al., "TDX: A High Performance Table-driven XML Parser", in proceedings of the 44$^{th}$ annual (ACM) Southeast Regional Conference, Mar. 2006, ACM, 6 pages.

Balmin et al., "Incremental Validation of XML Documents", ACM Trans. Database System 24, Dec. 2004, 42 pages.

* cited by examiner

SERVER 230
INTERNET
ISP
228
226
LOCAL NETWORK 222
HOST 224
NETWORK LINK
220
STORAGE DEVICE 210
ROM 208
MAIN MEMORY 206
BUS
202
200
COMMUNICATION INTERFACE 218
PROCESSOR 204
DISPLAY 212
INPUT DEVICE 214
CURSOR CONTROL 216

EFFICIENT PARTITIONING TECHNIQUE WHILE MANAGING LARGE XML DOCUMENTS

CROSS REFERENCE TO RELATED APPLICATIONS

This application claims the benefit of priority to U.S. Provisional Patent Application No. 60/829,652 filed on Oct. 16, 2006, entitled "ENHANCEMENTS FOR PROCESSING XML DATA" which is incorporated by reference in its entirety for all purposes as if originally set forth herein.

FIELD OF THE INVENTION

The present invention relates to managing XML content within a database, and more specifically to queries on that XML content.

BACKGROUND

The Extensible Markup Language (XML) is the standard for data and documents that is finding wide acceptance in the computer industry. XML describes and provides structure to a body of data, such as a file or data packet, referred to herein as an XML entity. The XML standard provides for tags that delimit sections of an XML entity referred to as XML elements. Each XML element may contain one or more name-value pairs referred to as attributes.

By defining an element that contains attributes and descendant elements, the XML entity defines a hierarchical tree relationship between the element, its descendant elements, and its attribute. A set of elements that have such a hierarchical tree relationship is referred to herein as an XML document.

An important standard for XML is the XQuery 1.0 and XPath 2.0 Data Model. (see W3C Candidate Recommendation 8 Jun. 2006, which is incorporated herein by reference). One aspect of this model is that a XML data is represented by a hierarchy of nodes that reflects the hierarchical nature of the XML data. A hierarchy of nodes is composed of nodes at multiple levels. The nodes at each level are each linked to one or more nodes at a different level. Each node at a level below the top level is a child node of one or more of the parent nodes at the level above. Nodes at the same level are sibling nodes. In a tree hierarchy or node tree, each child node has only one parent node, but a parent node may have multiple child nodes. In a tree hierarchy, a node that has no parent node linked to it is the root node, and a node that has no child nodes linked to it is a leaf node. A tree hierarchy has a single root node.

In a node tree that represents an XML document, a node can correspond to an element, the child nodes of the node correspond to an attribute or another element contained in the element. The node may be associated with a name and value.

It is important for object-relational database systems that store XML documents to be able to execute queries using XML query languages, such as XQuery/XPath. XML Query Language ("XQuery") and XML Path Language ("XPath") are important standards for a query language, which can be used in conjunction with SQL to express a large variety of useful queries. XPath is described in *XML Path Language (XPath)*, version 1.0 (W3C Recommendation 16 Nov. 1999), which is incorporated herein by reference. XPath 2.0 and XQuery 1.0 are described in XQuery 1.0 and XPath 2.0 Full-Text. (W3C Working Draft 9 Jul. 2004), which is incorporated herein by reference.

Various types of storage mechanisms are used to store an XML document in a serialized form. XMLType is a data type used to store XML content on database systems. XML documents stored as an XMLType allows developers to manipulate XML content using built-in functions. One type of storage mechanism stores an XML document as a text file in a file system. This is based on the form of a CLOB, or character large object, storing the actual XML text.

Another type of storage mechanism uses object-relational database systems that have been enhanced to store and query XML documents. In an embodiment, an XML document is stored in a row of a table and nodes of the XML document are stored in separate columns in the row. An XML document may also be stored as a hierarchy of objects in an object-relational database; each object is an instance of an object class and stores one or more elements of an XML document. The object class defines, for example, the structure corresponding to an element, and includes references or pointers to objects representing the immediate descendants of the element. Tables and/or objects of a database system that hold XML values are referred to herein as base tables or objects.

An XML document may also be stored as a binary representation. This is stored as a BLOB, or binary large object, in some binary form of the XML. Storing the XML document in binary form is an efficient form of data storage because it allows for quick access and processing by the database server. Tables containing binary XML columns can be partioned based on a value in the XML document.

XML documents may be stored in a table that is divided into partitions. In partitioning, an object, such as a database table, is divided up into sub-tables, referred to as "partitions". For various reasons, partitioning allows data stored in the object to be accessed more efficiently. Unfortunately, when storing an XML document in a partitioned table, the entire XML document must be stored in a buffer to determine the certain partition in which the XML document is stored. This overhead may be avoided by storing the XML document in a non-partitioned object, but at the cost of losing the advantage of being able to access data more efficiently in a partitioned table. Clearly, there is a need to store data in a partition in a way that avoids this sort of overhead.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
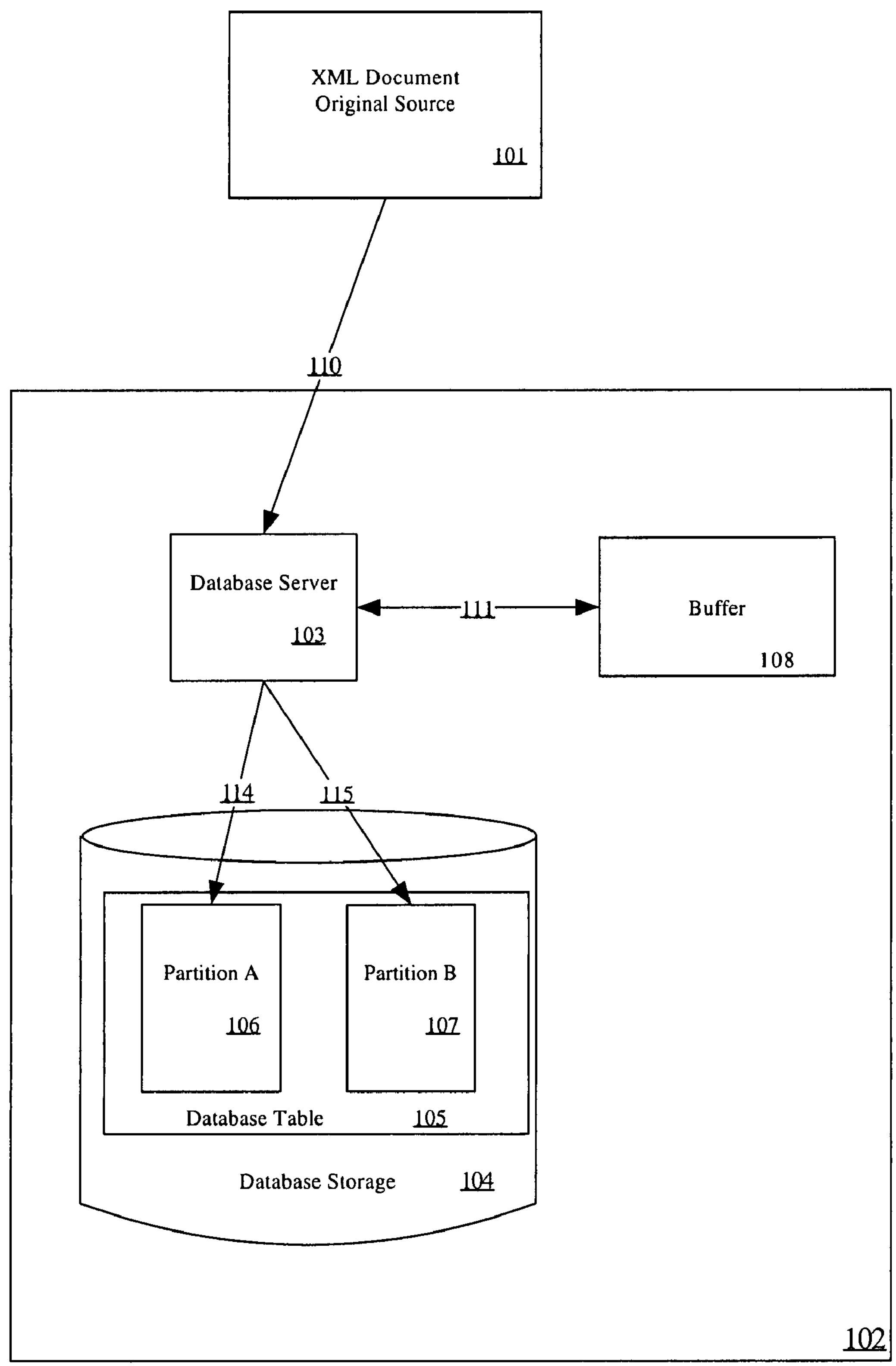
FIG. 1 is a block diagram of an embodiment of the invention displaying an XML document being stored in a partitioned table of a database system.

In the following description, for the purposes of explanation, numerous specific details are set forth in order to provide a thorough understanding of the present invention. It will be apparent, however, that the present invention may be practiced without these specific details. In other instances, wellknown structures and devices are shown in block diagram form in order to avoid unnecessarily obscuring the present invention.

According to an embodiment, an XML document is read into a buffer until information sufficient to determine what partition to store an XML document is encountered. Once the determination is made, the portions of the XML document already and subsequently read are stored in the partition. This measure eliminates the need to read and store the complete XML document in a buffer before storing the XML document in a partition. The information in an XML document used to determine which partition to store the XML document is referred to herein as partition key data. In an embodiment, the partition key data resides near the beginning of an XML document. Thus, only a relatively small portion of XML documents need be read before storing the XML document in a partition.

Partitioning

As mentioned previously, database partitioning improves the search efficiency of the database system in certain situations by avoiding the need to search an entire table. With database partitioning, an object, such as a database table, is divided up into sub-tables, referred to as "partitions". The particular partition in which a row or object is stored depends on values in one or more columns of the table. These columns are referred to herein as partition keys and the values contained in them are referred to as partition key values.

The most common form of partitioning is referred to as range partitioning. With range partitioning, each individual partition corresponds to a certain range of partition key values. For example, a partition key of a table may store date values that fall within a certain year, and the table may be divided into twelve partitions, each of which corresponds to a month of that year. Rows with a date value that fall within a certain month are stored in the partition that corresponds to that month.

Another form of partitioning is referred to as hash partitioning. In hash partitioning, one or more values in partition keys are applied to a hash function to produce a hash value. A separate partition is established for a hash function value produced by the hash function, and rows having a partition key value that evaluates to that hash function value are stored within the partition.

Partition Key Data

Partition key data is in the XML document that is a partition key value or is data from which a partition key value is derived. For XML documents stored in a database system, the partition key can be expressed as an expression based on partition key data in an XML document. Such an expression is referred to herein as a key expression. Typically, a key expression uses XML operators. An example of such is:

extractValue(object_value, '/PurchaseOrder/Reference')

This expression gives the value of the XML element at the XPath '/PurchaseOrder/Reference' in the given document. To evaluate a key expression, the entire document may be read and stored in a buffer to evaluate the key expression. This results in reading the XML document twice from its source, once for determining the partition key value and the second to store the XML document in a partition. This leads to serious performance degradation. It may also not be possible to read the document twice from its loading source due to complications from the network connection.

Streaming Evaluation

Streaming evaluation is one of several ways of evaluating an XPath expression. Streaming evaluation refers to techniques for transferring data such that the data can be processed as a steady and continuous stream, and keeping only minimal state information about the part of the document that was read. In addition to evaluating each expression separately, it is possible to evaluate a set of expressions on the same document using a single pass over the document using the streaming evaluation technique.

According to an embodiment, partition key data generally appears near the beginning of the XML document and the key expressions are relatively simple. In an embodiment of the invention, key expressions are evaluated using streaming evaluation where only the part of the document from the beginning until the occurrence of the partition key data is read. Under streaming evaluation, certain types of simple key expressions can be evaluated by reading the document serially. Furthermore, only minimal state information about the part of the XML document read is stored to increase efficiency.

In an embodiment of the invention, during streaming evaluation, once a result for a key expression has been obtained, the evaluation stops. This enhancement is performed by reading each chunk of data as it is received from the source. The size of the data chunk varies from implementation to implementation, and can change based upon the availability of memory. The partition key expression is then evaluated to determine if a result can be obtained.

This technique significantly reduces the cost of the evaluation due to two reasons. The I/O cost, or cost to read and store the data, is reduced because only a part of the document is read to perform the evaluation. For example, previously the XML document had to be read in its entirety two times, once for expression evaluation of the partition key value and once to store the XML document in the partition. The CPU cost is reduced because streaming evaluation is less taxing than other types of evaluation. For instance, in DOM or domain object model streaming, the entire XML document must be constructed into a DOM tree utilizing far more CPU resources.

When Streaming Evaluation is Unavailable

There are instances when the evaluation for the partition key is too complex to be performed using streaming evaluation. When this occurs, XML documents are converted into a DOM-based tree model which is an in-memory hierarchical representation of the XML document. The DOM-based tree model can then be traversed to retrieve and evaluate elements based on the XPath expression. This requires reading the entire XML document and storing it in the buffer and then building the DOM tree model node by node. The buffer of the database system includes all temporary storage memory in the buffer including volatile and non-volatile memory.

In an embodiment of the invention, the DOM tree model is built in a streaming manner incrementally. Thus, as the XML document is being read, the DOM tree model is built incrementally and the entire document need not be read before constructing the DOM tree model. This enhancement occurs because after reading each chunk of data from the source, the expression is evaluated by assuming that all ancestor elements, or those elements from which the present element descends, end after the last fully formed element. Then, as soon as a result is obtained, the evaluation is stopped.

This method increases efficiency because multiple passes are not used when reading and evaluating the XML document. Furthermore, the evaluation for the key expression usually occurs more quickly.

Storing in the Partition

In another embodiment, as the XML document is being read by the database server to evaluate the key expression, the XML document is stored in the buffer. The buffer includes all temporary storage memory in the buffer including volatile and non-volatile memory.

Once the partition key value is determined, the document is written to the target partition. In an embodiment of the invention, the database server is aware of the portion of the XML document that is stored in the buffer and the portion yet to be read from the original source. The database server retrieves the portion of the XML document stored in the buffer and the unread portion of the XML document from the original source to write to the partition. This reduces the I/O costs of the database system because the entire XML document is no longer re-read from the original source.

In another embodiment, the database system stores the XML document in the volatile buffer and the non-volatile buffer separately. Only when the XML document exceeds memory limits of the volatile buffer does the database server use the non-volatile buffer to store the XML document. Portions of the XML document are now stored in the volatile buffer, the non-volatile buffer or yet to be read from the original source. The database server is aware of the sections of the XML document that are stored in the volatile buffer, the non-volatile buffer or yet to be read from the original source. The portions of the XML document already read are retrieved from the volatile buffer and non-volatile buffer and only the unread portion of the XML document is retrieved from the source and written to the partition.

Example of an Embodiment

FIG. 1 is a block diagram illustrating an embodiment of the invention. The figure presented only displays a single embodiment of the invention and an embodiment of the invention is not limited to this single embodiment. The embodiment consists of the XML Document 101 stored on the original source and the database system 102. The database system 102 includes the database server 103 and database storage 104. Within the database storage 104 is a database table 105. The database table is partitioned into two partitions, partition A 106 and partition B 107. Depending on the partition key value of the XML document 101, the XML document may be stored in either of the two partitions.

A portion of the XML document is read 110 by the database server 103 whereupon the key expression is computed for the XML document. The database server computes the key expression using streaming evaluation. Should the key expression be too complex for streaming evaluation, then a DOM tree model is incrementally constructed until the expression is computed. In either case, once the key is evaluated and the resulting partition key value computed, evaluation is stopped before the entire XML document is read. The portions already read into the buffer are stored in the particular partition of the partition key value. Subsequently read portions of the XML document are stored in the partition. In this example, assume partition B 107 is the correct partition. Rather than re-reading the entire XML document from its original source, the portion of the XML document in the buffer 108 is stored 115 in partition B 107. Any unread portion of the XML document that was not required to evaluate the key expression is read and stored from the original source 101 into partition B 107.

Hardware Overview

Figure 2:
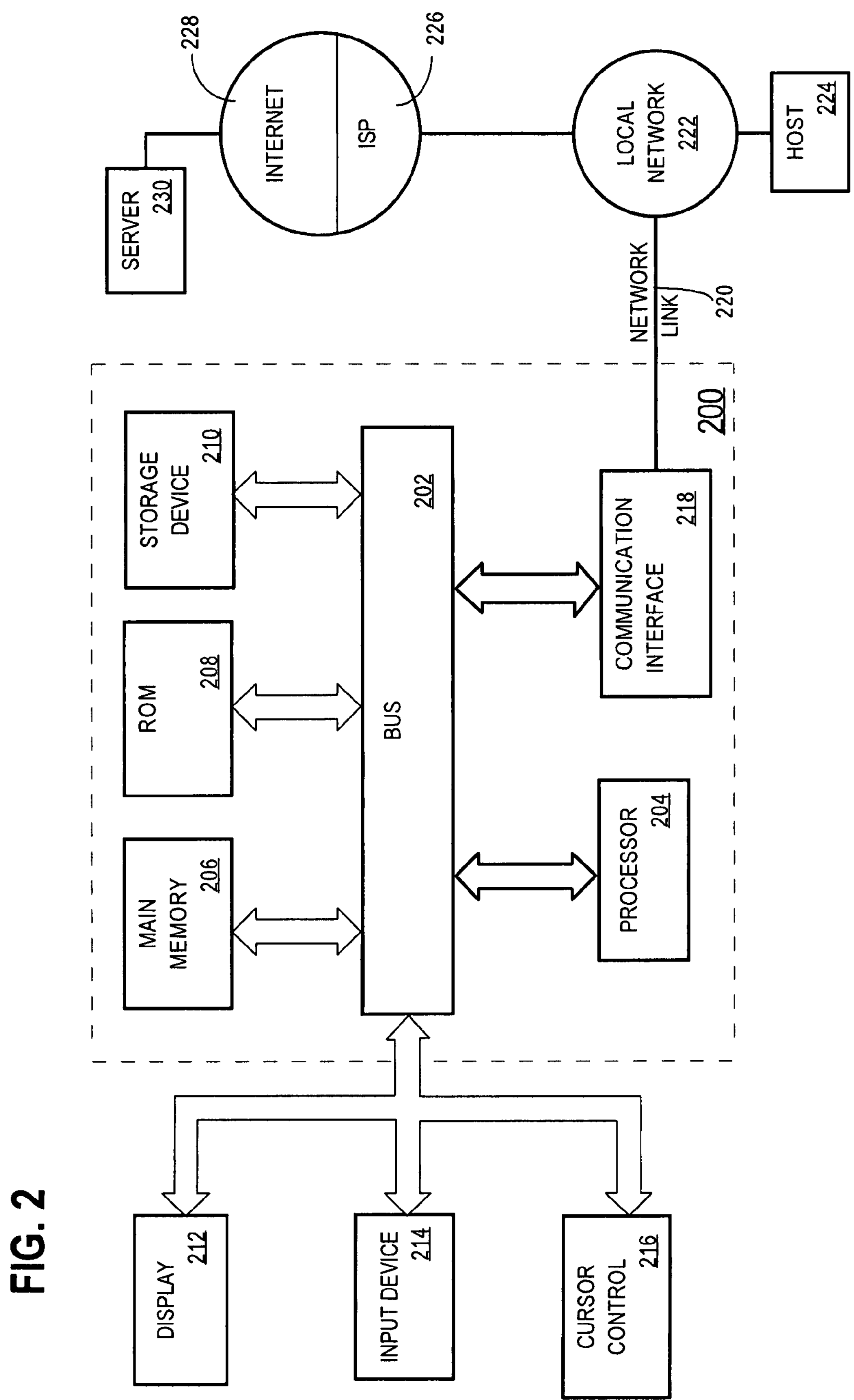
FIG. 2 is a block diagram of a computer system on which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for loading an XML document into a selected database table partition of a partitioned database table without reading the entire XML document into a buffer, wherein selection of the database table partition requires partition key information from the XML document, the method comprising:

beginning reading, from a source into the buffer, an XML document;

after reading into said buffer one or more portions of the XML document that include the required partition key information for the selection of the database table partition of the partitioned database table and without reading into said buffer one or more other portions of the XML document that include other information that is not required for selection of the database table partition, performing:

detecting that the one or more portions include the required partition key information for the selection of the database table partition of the partitioned database table, wherein the partitioned database table is divided into multiple partitions and stores a collection of XML documents, wherein each XML document of said collection is stored in a single partition selected for said each XML document based on information in said each XML document;

in response to detecting that the one or more portions include the required partition key information for the selection of the database table partition:

based at least in part on the required partition key information from said portion of said XML document, selecting the database table partition of the partitioned database table to store the XML document; and storing a read part of the XML document stored in the buffer to the selected database table partition, wherein the read part of the XML document includes the one or more portions;

after storing the read part of the XML document to the selected database table partition, reading and storing a remainder of the XML document from the source to the selected database table partition, wherein the remainder includes the one or more other portions of the XML document that include the other information that is not required for selection of the database table partition, wherein the method is performed by one or more computing devices.

2. The method of claim 1, wherein the required partition key information from said portion of said XML document is indicated by an expression that evaluates to a partition key value, and wherein selecting the database table partition of the partitioned database table is performed by evaluating the expression that evaluates to the partition key value.

3. The method of claim 1, wherein selecting the database table partition of the partitioned database table is performed by evaluating an expression containing an XPath expression.

4. The method of claim 2, wherein the expression evaluated to select the database table partition of the partitioned database table is computed using streaming evaluation.

5. The method of claim 4, wherein said streaming evaluation ceases in response to selecting the database table partition of the partitioned database table.

6. The method of claim 2, wherein the expression evaluated to select the database table partition of the partitioned database table is computed using DOM evaluation.

7. The method of claim 6, wherein said DOM evaluation ceases in response to selecting the database table partition of the partitioned database table.

8. The method of claim 1, wherein the method is performed by a database server running on the one or more computing devices.

9. A non-transitory machine-readable storage medium storing one or more sequences of instructions which, when executed by one or more processors, causes the one or more processors to perform loading an XML document into a selected database table partition of a partitioned database table without reading the entire XML document into a buffer, wherein selection of the database table partition requires particular information from the XML document, wherein the one or more sequences of instructions cause the one or more processors perform the loading by causing the one or more processors to perform:

beginning reading, from a source into the buffer, an XML document;

after reading into said buffer one or more portions of the XML document that include the required partition key information for the selection of the database table partition of the partitioned database table and without reading into said buffer one or more other portions of the XML document that include other information that is not required for selection of the database table partition, performing:

detecting that the one or more portions include the required partition key information for the selection of the database table partition of the partitioned database table, wherein the partitioned database table is divided into multiple partitions and stores a collection of XML documents, wherein each XML document of said collection is stored in a single partition selected for said each XML document based on information in said each XML document;

in response to detecting that the one or more portions include the required partition key information for the selection of the database table partition:

based at least in part on the required partition key information from said certain portion of said XML document, selecting the database table partition of the partitioned database table to store the XML document; and storing a read part of the XML document stored in the buffer to the selected database table partition, wherein the read part of the XML document includes the one or more portions;

after storing the read part of the XML document to the selected database table partition, reading and storing a remainder of the XML document from the source to the selected database table partition, wherein the remainder includes the one or more other portions of the XML document that include the other information that is not required for selection of the database table partition.

10. The machine-readable storage medium of claim 9, wherein the required partition key information from said portion of said XML document is indicated by an expression that evaluates to a partition key value, and wherein the one or more sequences of instructions, when executed, causes the one or more processors to perform the step of selecting the database table partition of the partitioned database table by causing the one or more processors to perform evaluating the expression that evaluates to the partition key value.

11. The machine-readable storage medium of claim 9, wherein the one or more sequences of instructions, when executed, causes the one or more processors to perform the step of selecting the database table partition of the partitioned database table by causing the one or more processors to perform evaluating an expression containing an XPath expression.

12. The machine-readable storage medium of claim 10, wherein the one or more sequences of instructions, when executed, causes the one or more processors to evaluate the expression to select the database table partition of the partitioned database table using streaming evaluation.

13. A machine-readable storage medium of claim 12, wherein said streaming evaluation ceases in response to the one or more processors selecting the database table partition of the partitioned database table.

14. The machine-readable storage medium of claim 10, wherein the one or more sequences of instructions, when executed, causes the one or more processors to evaluate the expression to select the database table partition of the partitioned database table using DOM evaluation.

15. The machine-readable storage medium of claim 14, wherein said DOM evaluation ceases in response to the one or more processors selecting the database table partition of the partitioned database table.

16. The machine-readable storage medium of claim 9, wherein the one or more sequences of instructions, when executed by the one or more processors, causes the one or more processors to perform as a database server.

* * * * *

UNITED STATES PATENT AND TRADEMARK OFFICE

CERTIFICATE OF CORRECTION

PATENT NO. : 7,933,935 B2
APPLICATION NO. : 11/716074
DATED : April 26, 2011
INVENTOR(S) : Idicula et al.

It is certified that error appears in the above-identified patent and that said Letters Patent is hereby corrected as shown below:

In column 2, line 27, delete "partioned" and insert -- partitioned --, therefor.

Signed and Sealed this
Fourth Day of October, 2011

David J. Kappos
*Director of the United States Patent and Trademark Office*